May 19, 1936.　　　P. BERGER　　　2,041,318
ROASTING MACHINE
Filed March 3, 1934　　　2 Sheets-Sheet 1

Inventor
Paul Berger
Attorneys

May 19, 1936.  P. BERGER  2,041,318
ROASTING MACHINE
Filed March 3, 1934  2 Sheets-Sheet 2
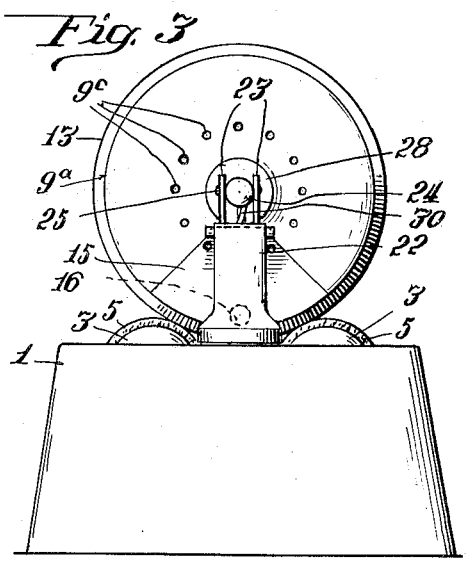
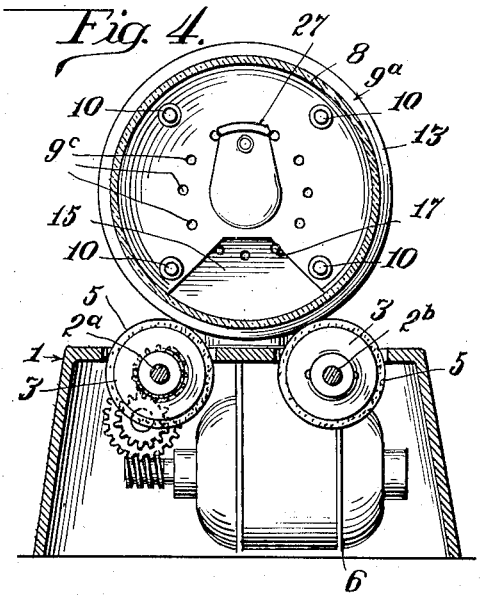
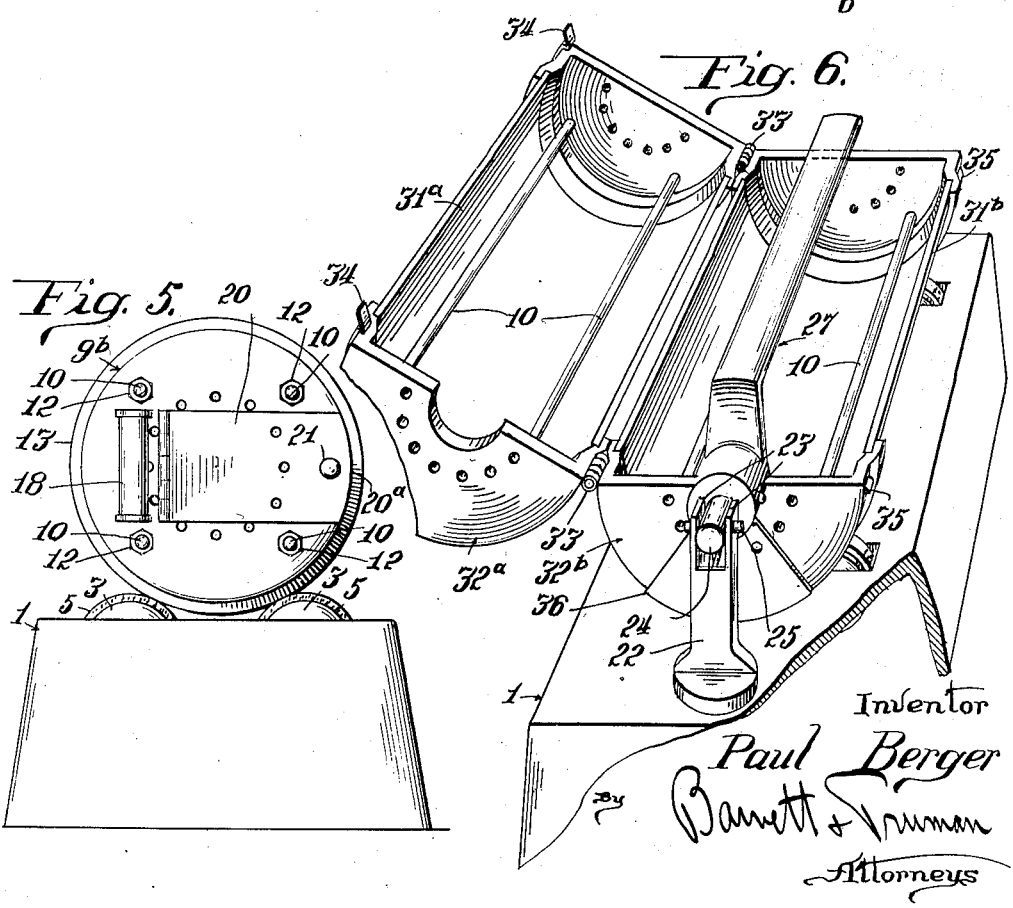
Inventor
Paul Berger Patented May 19, 1936

2,041,318

UNITED STATES PATENT OFFICE 2,041,318

ROASTING MACHINE

Paul Berger, Chicago, Ill., assignor of two-thirds to Wells W. Miller, Evanston, Ill., and Leroy G. Petterson, Chicago, Ill.

Application March 3, 1934, Serial No. 713,905

5 Claims. (Cl. 34—5)

My invention is directed to a novel form of roasting machine especially adapted for roasting nut meats.

The main object is to produce such a machine which is simple in construction and operation and which is also pleasing in appearance.

A further object is to produce a roaster which may be easily operated by an unskilled operator and which may be easily filled, emptied and cleaned and will at all times permit observance of the roasting nut meats by the operator so he can determine visually when the nut meats are roasted and by the public, which will attract them to the machine and thus increase the merchantability of the nut meats so roasted.

Another object is directed to such a roaster having a container which is rotated by frictional contact with rollers or wheels which form a cradle upon which it rests when in horizontal position.

Another object is to provide a transparent container of few parts whereby tie rods maintain the parts in assembled relationship and also act as agitators for the nut meats while roasting.

A still further object is to provide a novel mounting for such roaster whereby it is easily filled and emptied.

A further object is to provide a novel heating means and mounting therefor whereby the maximum heat is obtained and the greatest amount of nut meats may be treated at one filling.

Other objects and advantages will be apparent from the following detailed description.

Referring to the drawings:

Fig. 3 is an end elevation of Fig. 1 taken from the left.

Fig. 4 is a sectional view taken along line 4—4 of Fig. 1.

Fig. 5 is an end elevation of Fig. 1 taken from the right.

Fig. 6 is a perspective view partly broken away, of another embodiment of my invention.

Figure 1:
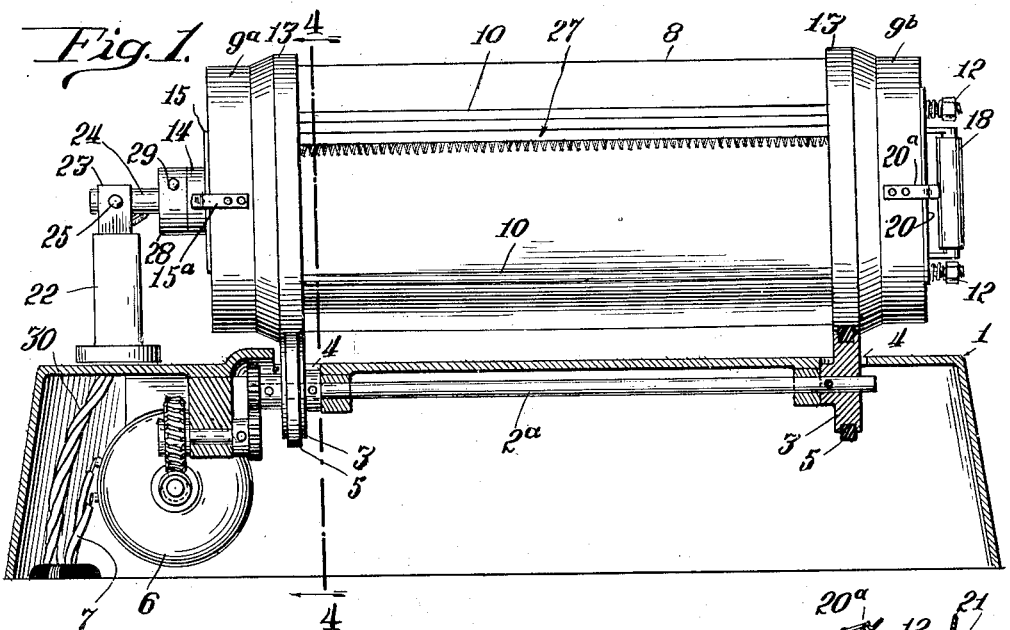
Fig. 1 is a side elevation partly in section of the preferred form of roasting machine.

In detail the roasting machine comprises a hollow base 1 of any desired convenient shape in which are journaled two longitudinally extending shafts 2a and 2b, in the same lateral plane and on the ends of which are secured wheels 3 which extend partially through the top of the base 1, through slots 4 to form a cradle for the nut container and are provided with composition tires 5. One of these shafts 2a, is connected by appropriate gearing to a motor 6 positioned with the base, the other shaft 2b being free. The motor 6 is driven by electricity from any convenient source through wires 7. The roaster proper comprises a glass cylinder 8 closed at each end by headers 9a and 9b preferably of metal which are secured to the ends of the cylinder 8 by a plurality of metal rods 10 extending within the cylinder adjacent its side and which are tapped into header 9a as at 11 and extend through 9b and are provided with nuts 12 which are tightened to hold the headers in spaced relationship and to the ends of the glass cylinder. These rods perform the double function of tie rods and agitators for the articles to be roasted. The headers 11 are each formed with a plurality of air vents 9c and with an outer circumferential flange 13 for the purpose hereafter disclosed. Header 9a is formed with a centrally positioned hub 14 and a small door 15 having a handle 16 and which is pivotally secured to a point adjacent the hub 14 and acts as a closure for an opening 17 in the header. The door is held in closed position by a spring catch 15a. Header 9b has secured to its outer side a handle 18 and is formed with an opening 19 closed by a door 20 having a handle 21 and which is pivotally mounted on the outer side of the header. Door 20 is held in closed position by spring catch 20a. A hollow post 22 is vertically mounted on the top of one end of the base 1 in a plane midway between the two shafts 2. The upper end of said post is bifurcated as at 23, Fig. 3. A round hollow shaft 24 is positioned within the bifurcation of post 22 and is pivotally mounted therein by means of pin 25 so as to be movable in a vertical plane. This shaft 24 extends through hub 14 of header 9a and to its inner end is secured a vertical bracket member 26, which bears against the inner face of hub 14 and to which is rigidly secured the horizontally extending electrical heating element 27 formed in the usual manner. A collar 28 is positioned on shaft 24 adjacent the outer surface of hub 14 and is secured in position in any desired manner such as by a pin 29 extending through it and a portion of the shaft. Wires 30 extend through the hollow post 22 and the hollow shaft 24 and to the heating element 27 and thereby furnish electricity for the heat from any convenient source.

By this construction it is apparent that the flanges 13 of the headers contact the periphery of the wheels 3 and that the entire weight of the roasting chamber is supported by said wheels.

Fig. 6 illustrates another embodiment of my invention in which the construction is similar to that above described with the following exceptions. The glass cylinder is formed in two like complementary sections 31a and 31b. The headers are each likewise composed of two complementary sections 32a and 32b, the one 32b having the hub portion and the other 32a being formed so as to be fitted to 32b to form a whole header similar to those hereinabove described. These two semi-cylinders are hinged together by means of hinge members 33 secured to the headers adjacent one corner of each. Spring fingers 34 are secured opposite the hinges to header sections 32a and projections 35 are formed on the corresponding portions of sections 32b so that upon swinging the two semi-cylinders together to form a cylinder the fingers 34 snap over projections 35 and hold the sections firmly together.

Figure 2:
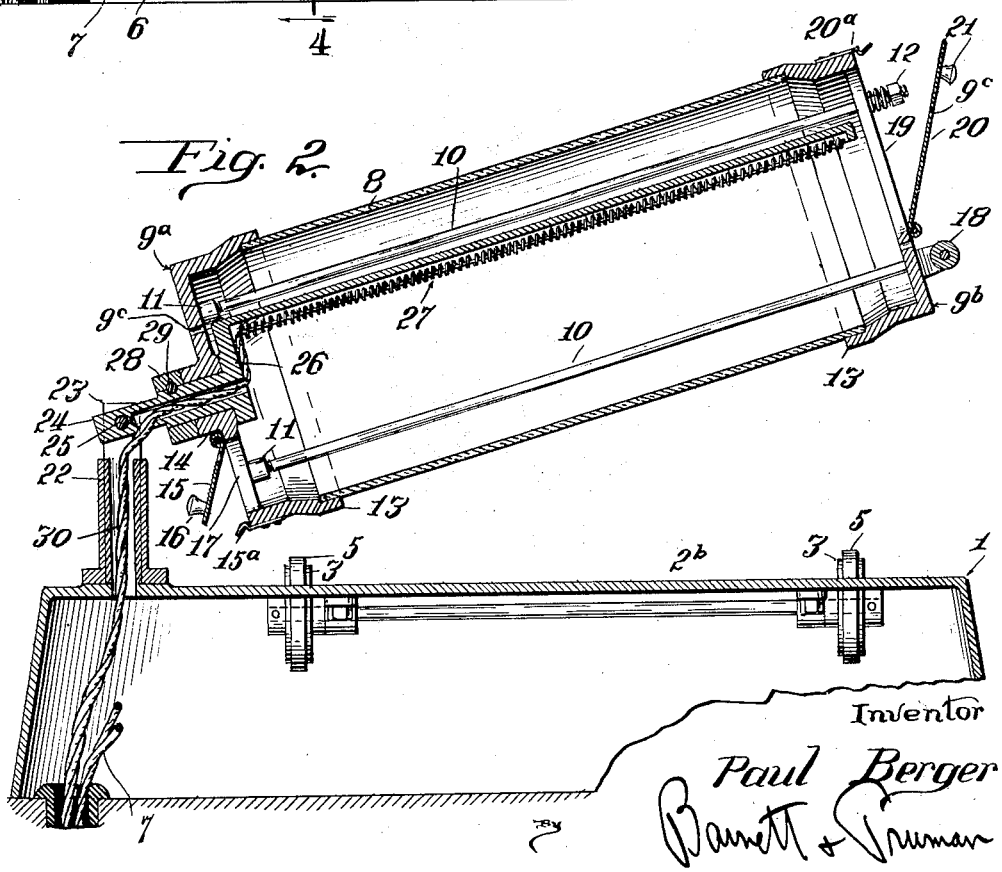
Fig. 2 is a central sectional view of the machine shown in Fig. 1 but in tilted position for filling, cleaning and emptying.

In the embodiment shown in Fig. 6 a door 36, similar to door 15 of Fig. 2, is present but no door is present in the other header.

In operation: Operator lifts the roasting chamber to the position shown in Fig. 2 by means of handle 12, opens the door 20 by means of handle 21, being sure door 15 is closed and inserts the nut meats to be roasted into the chamber 8 through open door 20. The chamber is then lowered to position shown in Fig. 1, the flanges 13 of the headers resting upon the wheels 3. The operator then turns on switches (not shown) causing electric current to enter the wires 17 and 30 and thereupon the heating element becomes hot and the motor 6 comes into operation and through the gearing shown causes one of the shafts 2a, to rotate in a clockwise direction. The roasting chamber being rotatably mounted on shaft 24 through hub 14 of header 9a and resting on and between the two pairs of wheels, one of which in each pair is driven by shaft 2a, thereupon rotates in a counter clockwise direction. Rods 10 rotating with the chamber 8 pass through the nut meats and thus constantly agitate them while the heating unit rigidly positioned in the upper part of the chamber so that the greatest number of nuts can be roasted at once, cause the moisture within the nuts to escape therefrom and into the atmosphere through air vents 9c. The chamber 8 being transparent the roasting operation attracts prospective purchasers and also allows the operator to know by the appearance of the nut meats when they have been sufficiently roasted. When this occurs the operator turns off the electricity, again lifts the unit to the position shown in Fig. 2, places a container of desired kind under the lower end, opens door 15 and the roasted nut meats are thereby emptied.

In the operation of the embodiment shown in Fig. 6 the nuts are placed in the container when in open position as shown in Fig. 6 and when it is folded to closed position the power is applied and the roasting process is the same. In order to empty the container it may either be lifted as shown in Fig. 2 and door 36 opened or it may be unfolded as shown in Fig. 6 and the nuts scooped out or emptied by revolving it a quarter of a turn or so.

I claim:

1. A roasting machine comprising a rotatable cylindrical glass tube, headers for enclosing the ends of said tube, a plurality of rods extending horizontally within said tube adjacent its side so as to agitate the contents of said tube when it is rotated and secured to the headers to hold them in enclosing position.

2. A roasting machine comprising a cylindrical glass tube, headers for enclosing the ends of said tube, a plurality of rods extending within said tube adjacent its sides and secured to the headers to hold them in enclosing position, a base, a post vertically mounted on said base, said tube joined to said post so as to be vertically pivoted and rotatable and means comprising a plurality of wheels upon which said headers rest for rotating said tube.

3. A roasting machine comprising a cylindrical glass tube, headers for enclosing the ends of said tube, a plurality of rods extending longitudinally within said tube adjacent its side and secured to the headers to hold them in enclosing position, a base, a post positioned vertically on said base, a shaft secured to said post so as to be vertically pivotal and extending through one of said headers and means frictionally contacting the headers for rotating said tube.

4. A roasting machine comprising a base, a post mounted on said base in vertical position, a shaft pivotally mounted on said post, a cylindrical glass tube, headers for said tube formed with air vents, doors in said headers, rods extending between said headers within said tube adjacent its side, one of said headers being rotatably mounted on said shaft, said shaft extending within said tube, a heating element rigidly secured to the inner end of said shaft, a handle on the header not mounted on the shaft, a plurality of shafts rotatably mounted within said base, wheels rigidly mounted on said shafts and extending vertically from said base to form a cradle upon which said container when in horizontal position and means for rotating one of said shafts.

5. A roasting machine comprising a cylindrical glass tube, headers enclosing the ends of said tube, a plurality of rods extending within the tube adjacent its sides to agitate the contents when rotated and to hold the headers in enclosed position, a base, a post vertically mounted on said base, said tube joined to said post so as to be vertically pivoted and rotatable and means comprising a cradle of wheels for rotating said tube.

PAUL BERGER.